United States Patent
Cai et al.

(10) Patent No.: US 9,231,774 B2
(45) Date of Patent: Jan. 5, 2016

(54) CONGESTION CONTROL FOR RADIO ACCESS NETWORKS (RAN)

(71) Applicants: Yigang Cai, Naperville, IL (US); Ranjan Sharma, New Albany, OH (US)

(72) Inventors: Yigang Cai, Naperville, IL (US); Ranjan Sharma, New Albany, OH (US)

(73) Assignee: Alcatel Lucent, Boulogne-Billancourt (FR)

( * ) Notice: Subject to any disclaimer, the term of this patent is extended or adjusted under 35 U.S.C. 154(b) by 158 days.

(21) Appl. No.: 13/628,840

(22) Filed: Sep. 27, 2012

(65) Prior Publication Data

US 2014/0086052 A1    Mar. 27, 2014

(51) Int. Cl.
| | |
|---|---|
| *H04L 12/14* | (2006.01) |
| *H04L 12/801* | (2013.01) |
| *H04M 15/00* | (2006.01) |
| *H04W 28/02* | (2009.01) |
| *H04L 12/911* | (2013.01) |
| *H04W 4/24* | (2009.01) |

(52) U.S. Cl.
CPC ............ *H04L 12/1407* (2013.01); *H04L 47/11* (2013.01); *H04L 47/12* (2013.01); *H04L 47/748* (2013.01); *H04M 15/66* (2013.01); *H04M 15/8027* (2013.01); *H04W 28/0284* (2013.01); *H04W 28/0289* (2013.01); *H04L 12/1489* (2013.01); *H04M 15/8016* (2013.01); *H04W 4/24* (2013.01)

(58) Field of Classification Search
None
See application file for complete search history.

(56) References Cited

U.S. PATENT DOCUMENTS

| | | | |
|---|---|---|---|
| 2009/0060154 A1* | 3/2009 | Cai .......................... | 379/127.05 |
| 2011/0299395 A1* | 12/2011 | Mariblanca Nieves ....... | 370/235 |
| 2012/0176894 A1* | 7/2012 | Cai et al. ...................... | 370/230 |
| 2012/0195196 A1* | 8/2012 | Ghai et al. .................... | 370/235 |
| 2012/0259747 A1* | 10/2012 | Byström et al. ................ | 705/30 |
| 2012/0290452 A1* | 11/2012 | Pancorbo Marcos et al. .. | 705/30 |
| 2014/0040975 A1* | 2/2014 | Raleigh et al. .................. | 726/1 |

FOREIGN PATENT DOCUMENTS

| | | |
|---|---|---|
| EP | 2645764 A1 | 10/2013 |
| WO | 2012083795 A1 | 6/2012 |

OTHER PUBLICATIONS

3rd Generation Partnership Project; Technical Specification Group SA; Feasibility Study on User Plane Congestion Management (Release 12), 3GPP TR 22.805, Aug. 6, 2012, XP050681218, Retrieved from the internet: URL:http://www.3gpp.org/ftp/tsg_sa/WG1_Serv/TSGS1_59_Chicago/docs/ [retrieved on Aug. 6, 2012] par. [04.2]-[04.4],[4.11],[6.2.1]-[6.2.2].*

(Continued)

*Primary Examiner* — Ashley Shivers
(74) *Attorney, Agent, or Firm* — Duft Bornsen & Fettig, LLP

(57) ABSTRACT

Systems and methods are disclosed for controlling congestion in a Radio Access Network (RAN). One embodiment comprises a charging system of a network. The charging system receives a traffic report for a RAN indicating a congestion condition in an area of the RAN. The charging system then identifies a subscriber in the area of the RAN, identifies a service plan for the subscriber, and generates modified rules that deviate from predefined rules in the service plan of the subscriber in response to the congestion condition. The charging system then provides the modified rules to a network entity, such as a Policy and Charging Rules Function (PCRF), that performs policy and charging control for a service requested by the subscriber.

20 Claims, 5 Drawing Sheets

(56) References Cited

OTHER PUBLICATIONS

Network Optimization Focus Group (NetOp-FG), Assessment and Recommendations:, 3GPP DRAFT; ATIS Network Optimization Focus Group (NetOp-FG) Assessment & Recommendations, Nov. 8, 2011, XP050574392, [retrieved on Nov. 8, 2011] par. [01.1]-[01.5], [0002], [0004], [04.1]-[04.2], [04.4], [0005], [6.1.1]-[6.1.2], [6.1.3.1], [6.2.2], [6.4.1], [0007].*

3rd Generation Partnership Project; Technical Specification Group Services and System Aspects; Policy and charging control architecture (Release 11) 3GPP TS 23.203 V11.0.1 (Jan. 2011) 650 Route des Lucioles—Sophia Antipolis Valbonne—France.

\* cited by examiner

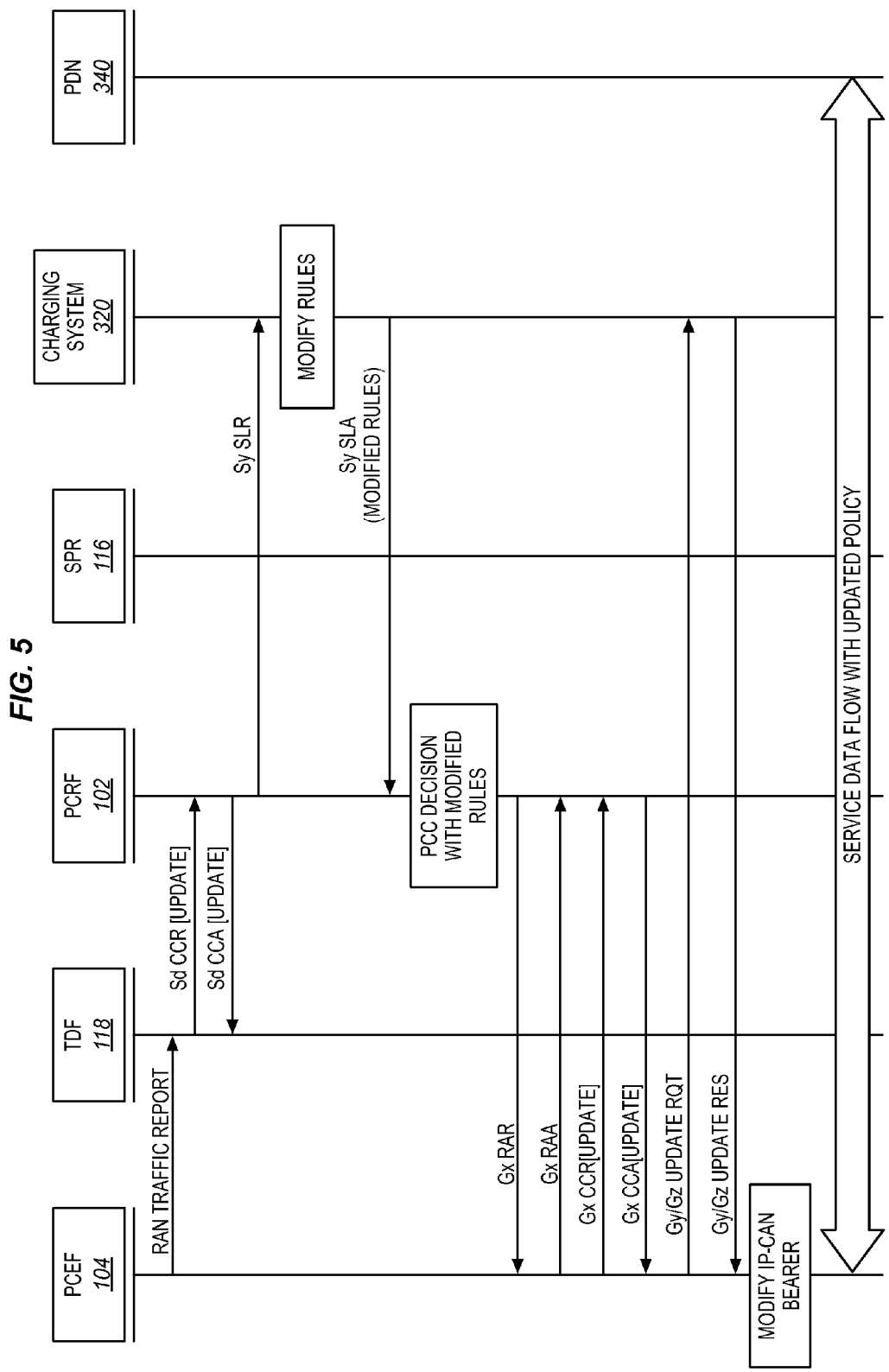

CONGESTION CONTROL FOR RADIO ACCESS NETWORKS (RAN)

FIELD OF THE INVENTION

The invention is related to the field of communication networks and, in particular, to controlling congestion in Radio Access Networks (RAN).

BACKGROUND

Service providers typically provide numerous voice and data services to end users (also referred to as subscribers). Examples of voice services are voice calls, call forwarding, call waiting, etc. Examples of data services are streaming audio, streaming video, Voice over Internet Protocol (VoIP), online gaming, and IP-TV. The data services are managed by a packet core network, which interfaces the end user with external packet data networks (PDN), such as the Internet. Some examples of packet core networks are a General Packet Radio Service (GPRS) core network, an Evolved Packet Core (EPC) network, etc. To utilize data services, an end user uses a mobile device, such as a cell phone, to connect with a Radio Access Network (RAN). The RAN may be a packet-based network that provides IP connectivity, which is also referred to as an IP Connectivity Access Network (CAN). The RAN in turn connects to the packet core network in order to provide the end user with access to the data services.

When the mobile device initiates a session (e.g., an IP-CAN session), the session request from the mobile device includes a description of the requested service (e.g., online gaming, IP-TV, etc). The packet core network authenticates the mobile device and determines which services the mobile device is authorized to receive. If the requested service is authorized, then the packet core network reserves a bearer path (e.g., an IP CAN bearer) of a defined capacity, delay, and bit error rate over a selected Packet Data Network (PDN). A flow of packets may then begin for the service, which is referred to as a service data flow over the PDN.

Network operators implement Policy and Charging Control (PCC) within their networks to control how services are provided to end users. Policy control refers to the process of controlling the bearer path for service data flows, such as for bearer establishment, Quality of Service (QoS) control, and gating control (blocking or allowing packets to pass). Policy rules are predefined for each end user and govern which network services the end user is allowed to access, the bandwidth level that is provided, when the services are allowed, how long the services are allowed, etc. Charging control refers to the process of associating packets of a service data flow with a charging key or charging identifier, and applying online charging and/or offline charging as appropriate. Charging rules are predefined for each end user and govern the type of charging applied to a service, the tariff(s) applied to a service, etc. The policy rules and charging rules are set out in a service plan subscribed to by the end user.

The 3rd Generation Partnership Project (3GPP, 3GPP2) has defined a PCC architecture that provides policy and charging control for packet core networks. One example of a PCC architecture is described in 3GPP TS 23.203 (Release 9). The PCC architecture suggested by the 3GPP includes a Policy and Charging Rules Function (PCRF), a PDN gateway comprising a Policy and Charging Enforcement Function (PCEF), an application function (AF), a Bearer Binding and Event Reporting Function (BBERF), a Home Subscriber Server (HSS)/Subscription Profile Repository (SPR), an Online Charging System (OCS), and an Offline Charging System (OFCS). As a brief description of some of the elements of the PCC architecture, the PCRF makes policy control decisions and flow-based charging control decisions to select which PCC rules to implement for a service data flow. The PCEF in the gateway provides service data flow detection, user plane traffic handling, QoS handling, service data flow measurement, and online/offline charging interactions. The HSS/SPR stores subscriber data and subscription related information for end users, such as in subscriber profiles.

The PCRF in the PCC architecture makes a PCC decision when an end user requests a service. Presently, the PCRF makes the PCC decision based on a predefined set of policy rules and charging rules for the end user that are set out in his/her service plan. For example, an end user may subscribe to a "gold" class of service that guarantees 10 Mbps of download speed and 2 Mbps of upload speed. The network operator can guarantee these download and upload speeds most of the time. But, there are instances where these speeds may not be possible, such as when there is congestion in an area of the RAN. Network operators continue to look for ways to handle congestion issues within the network, such as in the RAN.

SUMMARY

Embodiments described herein dynamically modify the policy and/or charging rules that are predefined in the service plan of an end user to address congestion issues in the RAN. When there is a congestion condition in an area of the RAN, a traffic report is provided to a charging system. The traffic report may indicate that there is congestion (or no condition) in the RAN. To alleviate the effects of the RAN congestion, the charging system alters policy and/or charging rules for end users that are affected by the RAN congestion. For example, if a service plan of an end user defines a QoS, then the charging system may downgrade this QoS while the end user is located in an area of the RAN that is congested. If the service plan of the end user defines a tariff for voice calls, then the charging system may increase the tariff while the end user is located in the area of the RAN that is congested. The adjustments to the policy and/or charging rules of an end user are intended to discourage the end user from initiating a session while being located in an area of the RAN that is congested. If enough end users are discouraged from initiating sessions, then the congestion condition in the RAN will be less severe or won't occur in the future.

The charging system may also alter the policy and/or charging rules of an end user to encourage the use of other areas of the RAN that are not congested and are being underutilized. For example, the charging system may upgrade QoS, decrease tariffs, or otherwise adjust the policy and/or charging rules when end users are located in an area of the RAN that is handling a low traffic volume. The adjustments to the policy and/or charging rules of an end user are intended to encourage the end user to initiate a session when located in an area of the RAN that is underutilized instead of using an area of the RAN that is congested.

One embodiment comprises a charging system configured to receive a traffic report for a RAN indicating a congestion condition in an area of the RAN. The charging system is further configured to identify a subscriber in the area of the RAN, to identify a service plan for the subscriber, and to generate modified rules that deviate from predefined rules in the service plan of the subscriber in response to the congestion condition. The charging system is further configured to provide the modified rules to a network entity, such as a Policy and Charging Rules Function (PCRF), that performs policy and charging control for a service requested by the subscriber.

In another embodiment, the charging system is further configured to generate the modified rules to downgrade or upgrade a Quality of Service (QoS) predefined in the service plan.

In another embodiment, the charging system is further configured to generate the modified rules to increase or decrease a tariff predefined in the service plan.

In another embodiment, the charging system is further configured to send a notification to a mobile device of the subscriber describing the modified rules.

In another embodiment, the charging system connects to a PCRF over a Diameter Sy interface. The charging system is further configured to receive the traffic report for the RAN from the PCRF in a message (e.g., a Diameter Sy message). The message may include an Attribute Value Pair (AVP) defined for a cell identifier for the area of the RAN, an AVP that defines a congestion level for the area of the RAN, and/or an AVP that defines a time during which the area of the RAN experiences the congestion condition.

Another embodiment comprises a method of modifying rules for a subscriber based on congestion conditions in a RAN. The method includes receiving, in a charging system, a traffic report for the RAN indicating a congestion condition in an area of the RAN. The method further includes identifying a subscriber in the area of the RAN, identifying a service plan for the subscriber, and generating modified rules that deviate from predefined rules in the service plan of the subscriber in response to the congestion condition. The method further includes providing the modified rules from the charging system to a network entity, such as a Policy and Charging Rules Function (PCRF), that performs policy and charging control for a service requested by the subscriber.

Another embodiment comprises a PCC architecture for a network. The architecture includes a charging system coupled to a PCRF over a Diameter Sy interface. The charging system is configured to receive a message from the PCRF over the Diameter Sy interface indicating a congestion condition in an area of a RAN. The charging system is further configured to identify subscribers in the area of the RAN, to identify service plans for the subscribers, to modify rules from the service plans of the subscribers to address the congestion condition in the area of the RAN, and to provide the modified rules to the PCRF over the Diameter Sy interface. The PCRF is configured to make PCC decisions for the subscribers based on the modified rules provided by the charging system.

In another embodiment, the architecture includes a Traffic Data Function (TDF) configured to receive traffic data for the RAN, to detect the congestion condition in the area of the RAN, and to send a report to the PCRF indicating the congestion condition in the area of the RAN.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

FIG. 5 is a message diagram that illustrates a charging system modifying policy and/or charging rules to address congestion in a RAN in an exemplary embodiment.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
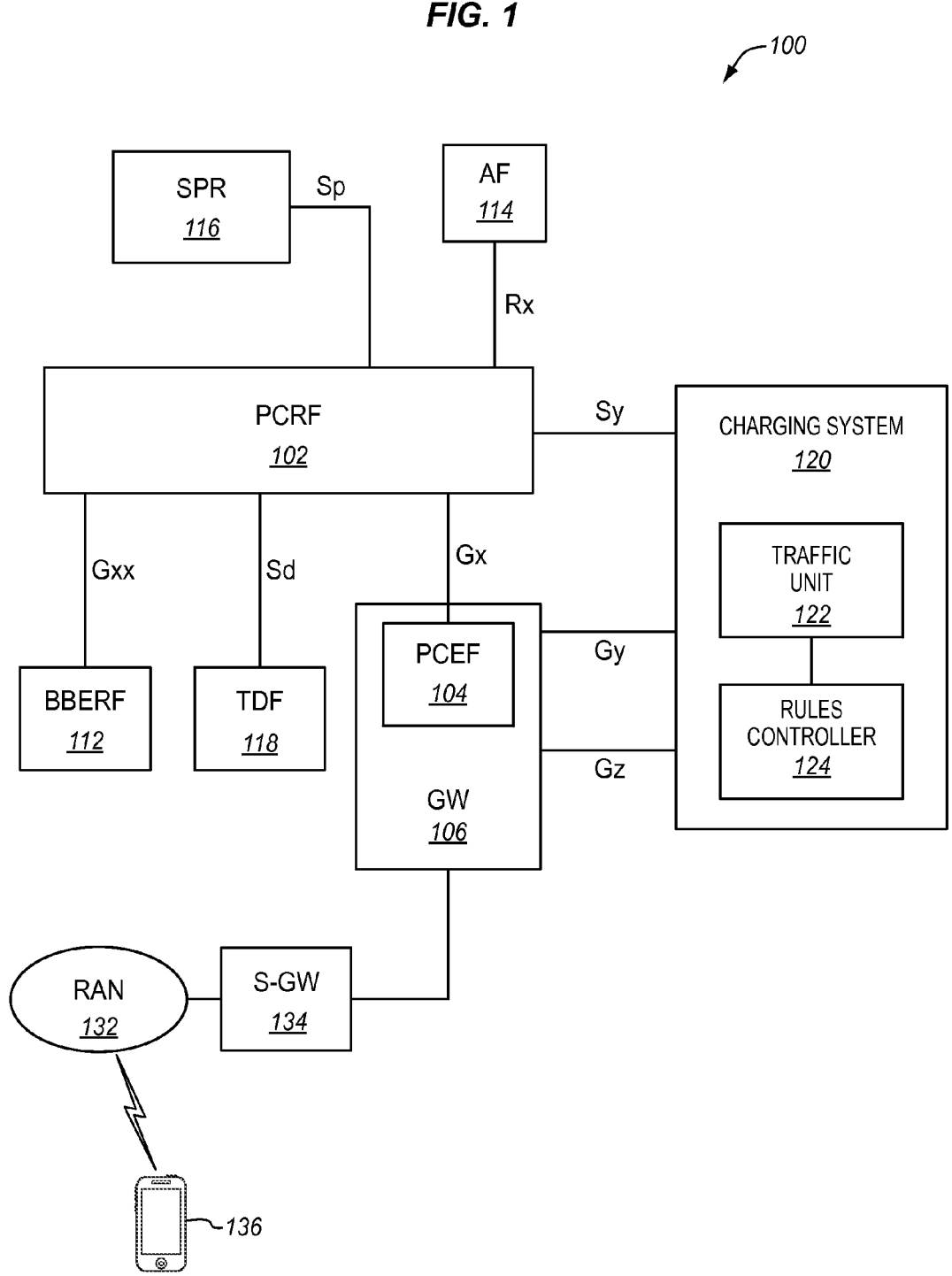
FIG. 1 illustrates a Policy and Charging Control (PCC) architecture for a packet core network in an exemplary embodiment.

FIG. 1 illustrates a Policy and Charging Control (PCC) architecture 100 for a packet core network in an exemplary embodiment. For example, the PCC architecture 100 may be used in a Long Term Evolution/Evolved Packet Core (LTE/EPC) network or another type of 4G network. PCC architecture 100 includes a Policy and Charging Rules Function (PCRF) 102 and a Policy and Charging Enforcement Function (PCEF) 104 that together provide a Policy and Charging Control (PCC) solution in the packet core network. PCRF 102 is a node or entity of the network that formulates PCC rules for services requested by an end user, which is referred to herein as making a PCC decision. PCRF 102 may have a policy engine (not shown) that makes the PCC decision based on policy and/or charging rules defined for the end user. Although the term "PCRF" is used in this description, the functionality of PCRF 102 is applicable to any network entity that performs policy and charging control in a packet core network.

PCEF 104 is a node that enforces the PCC rules for services request by an end user. For example, PCEF 104 may set up bearer connections for the service, modify existing bearer connections, ensure that only authorized service data flows are established, ensure that QoS limits are not exceeded, and the like. PCEF 104 is typically implemented in a gateway (GW) 106 between the end user and a packet data network, such as Packet Data Network Gateway (P-GW) in an EPC network.

PCC architecture 100 further includes a Bearer Binding and Event Reporting Function (BBERF) 112, an application function (AF) 114, a Subscriber Profile Repository (SPR) 116, and a Traffic Data Function (TDF) 118. Application Function (AF) 114 is a node in the packet data network (e.g., Internet, IMS, etc.) that provides services requested by an end user. AF 114 describes a requested service to PCRF 102 via a Diameter Rx interface or other suitable protocol interface. For example, AF 114 may provide IP-addresses, port numbers, bit rates, delay sensitivity, etc., for requested services to PCRF 102. PCRF 102 may then use this information when making PCC decisions.

SPR 116 stores subscriber profiles for end users. The subscriber profiles may include policy rules (and possibly charging rules) that are used by PCRF 102 to make a PCC decision. The policy rules govern which network services the end user is allowed to access, the bandwidth level that is provided, the time(s) when the services are allowed, how long the services are allowed, etc. The policy rules and charging rules together are referred to herein as a service plan (or PCC plan) for an end user (or subscriber). SPR 116 interfaces with PCRF 102 via a Diameter Sp interface or any other protocol used to exchange policy rules with PCRF 102.

TDF 118 stores traffic data for access networks and/or the packet core network. The traffic data may vary with time, location, service flows, service directions, etc. TDF 118 interfaces with PCRF 102 via a Diameter Sd interface or any other suitable protocol interface to send the traffic data (real-time or history) for PCC decisions.

Also shown in FIG. 1 are a Radio Access Network (RAN) 132 and a Serving Gateway (S-GW) 134 that provide connectivity to a mobile device 136 of an end user. RAN 132 includes a plurality of transceivers that communicate with mobile devices using radio frequencies. The transceivers are typically referred to as base stations, but may also be referred to as access points, cell sites, etc. Each base station of RAN 132 forms a "cell". The base stations may be distributed over large areas so that the cells form a honeycomb-like configuration that defines the service area of the RAN 132. Typically, each cell uses a different set of frequencies from neighboring cells to avoid interference and provide guaranteed bandwidth within each cell.

Architecture 100 also includes charging system 120. Charging system 120 is able to charge for sessions established over the packet core network. For example, charging system 120 may receive a charging request from a network element, such as PCEF 104. In response to the charging request, charging system may rate the session (or service), and provide a charging response to the network element that sent the charging request. In this embodiment, charging system 120 may represent an online charging system (OCS), an Offline Charging System (OFCS), or a converged charging system that provides both online and offline charging. An OCS provides online charging for services/sessions accessed by end users. In addition, an OCS stores charging rules for the end users, which PCRF 102 may use in making a PCC decision. For example, charging rules may define that an end user is a prepaid subscriber, and may define tariffs for different services requested by the end user. An OFCS provides offline charging for services/sessions accessed by end users. An OFCS may include a Charging Data Function (CDF) and a Charging Gateway Function (CGF) for handling offline charging operations.

In the following embodiments, charging system 120 is enhanced to address congestion conditions detected in RAN 132. Charging system 120 handles congestion conditions by modifying policy and/or charging rules predefined in a service profile of an end user based on traffic conditions in RAN 132. The modified rules may then be used by PCRF 102 in making a PCC decision.

Charging system 120 includes a traffic unit 122 that receives and maintains data about the traffic conditions within RAN 132. Traffic unit 122 may receive traffic reports for RAN 132 from a variety of sources. For example, traffic unit 122 may receive traffic reports for RAN 132 from PCRF 102 over a Diameter Sy interface. Traffic unit 122 may also receive traffic reports for RAN 132 from TDF 118 or other elements.

Charging system 120 also includes a rules controller 124 that stores or accesses service plans for subscribers. A service plan indicates policy and/or charging rules that are predefined for that subscriber. Rules controller 124 is also able to adjust the predefined (policy and/or charging) rules found in the service plan of a subscriber to generate modified rules that account for the congestion conditions found to exist in RAN 132. For example, rules controller 124 may downgrade QoS for a service from a QoS predefined in the service plan of a subscriber. In another example, rules controller 124 may increase a tariff for a service from a tariff predefined in the service plan of a subscriber. Modifications such as this to the policy and/or charging rules may discourage a subscriber from accessing services through an area of RAN 132 that is experiencing congestion. This will lessen the severity of the congestion or avoid future congestion in the RAN 132. A more detailed operation of charging system 120 is illustrated in FIG. 2.

Figure 2:
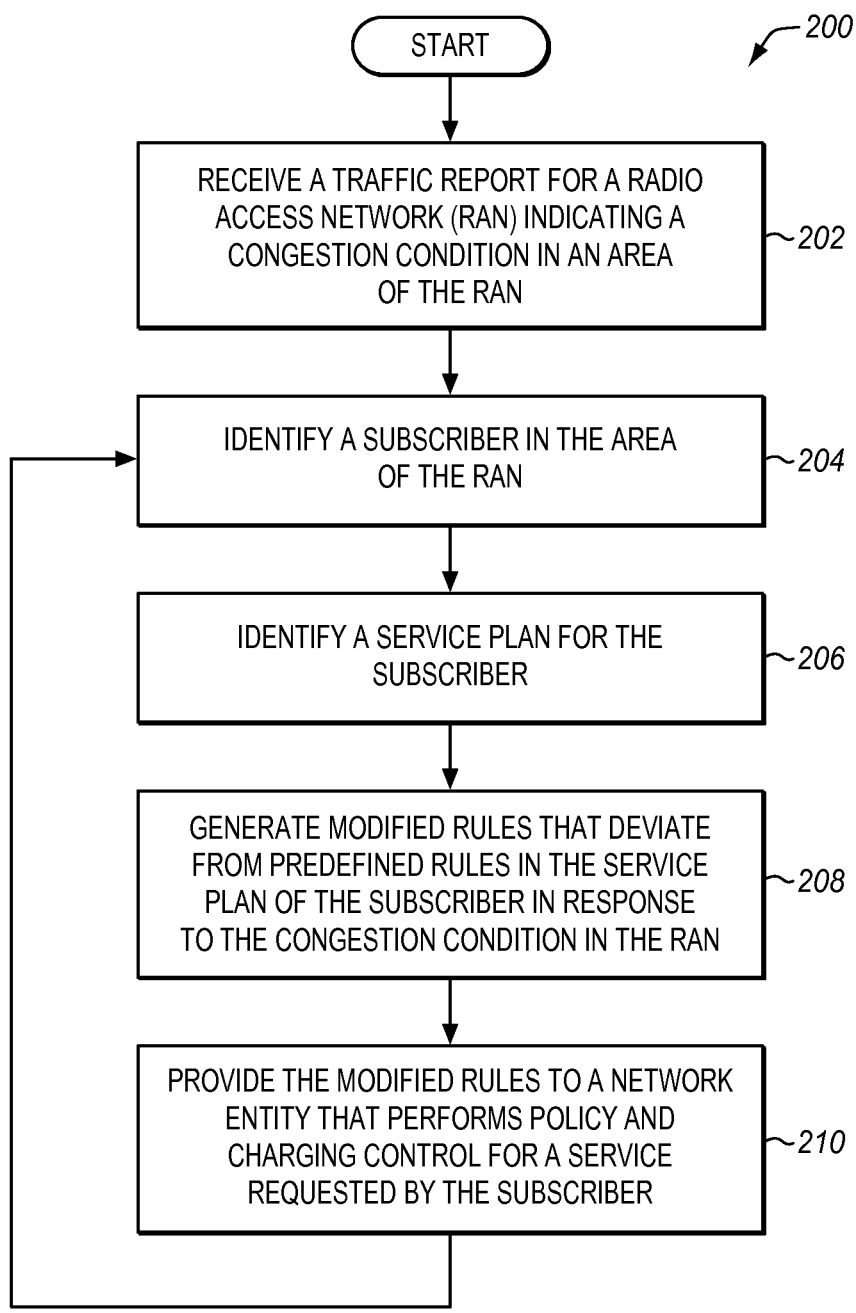
FIG. 2 is a flow chart illustrating a method of modifying rules from a service plan in an exemplary embodiment.

FIG. 2 is a flow chart illustrating a method 200 of modifying rules from a service plan in an exemplary embodiment. The steps of method 200 are described with reference to PCC architecture 100 in FIG. 1, although methods described herein may be performed in other nodes or systems. The steps of the flow charts described herein are not all inclusive and may include other steps not shown. The steps may also be performed in an alternative order.

In step 202, traffic unit 122 of charging system 120 receives one or more traffic reports for RAN 132. A traffic report comprises any data or information regarding the traffic (e.g., the amount or type) within RAN 132. Traffic unit 122 may receive the traffic reports periodically, or may request traffic reports from elements shown in the PCC architecture 100. Traffic unit 122 then stores and analyzes the traffic reports for RAN 132. One assumption for this embodiment is that a congestion condition is identified within an area (i.e., within a portion of the coverage area) of RAN 132. A congestion condition may represent a condition where excessive traffic is identified within the area of RAN 132. For example, traffic unit 122 may be able to analyze the traffic reports to detect that one or more base stations within RAN 132 are receiving a number of service requests that exceeds a threshold within a time period. A congestion condition may also represent a condition where moderate or low traffic is identified within the area of RAN 132. For example, traffic unit 122 may be able to analyze the traffic reports to detect that one or more base stations within RAN 132 are handling a low number of service requests (e.g., well below a threshold set for the base station(s)).

The traffic reports themselves may indicate a congestion condition in an area of RAN 132. The congestion condition may be indicated by cell ID, congestion level, time of the congestion, etc.

If a congestion condition is identified in RAN 132, then rules controller 124 identifies a subscriber that is located in the area of RAN 132 in step 204. The congestion condition will relate to a specific location within RAN 132, such as a particular cell or group of cells. Rules controller 124 is able to identify the subscriber as being located in the area that is affected by the congestion condition. When the term "subscriber" is used herein, the term may apply to an individual end user, a mobile device (e.g., UE) for the end user, and/or the combination of an individual end user and a mobile device.

In step 206, rules controller 124 identifies a service plan for the subscriber that is located in the area of RAN 132. As described above, the service plan includes (policy and/or charging) rules that are predefined for the subscriber for providing services. However, because RAN 132 is experiencing the congestion condition, the rules predefined in the service plan may not work effectively for a service requested by the subscriber. Thus, rules controller 124 generates modified rules in response to the congestion condition in step 208. The modified rules differ or deviate from the predefined rules in the service plan of the subscriber to address the congestion condition found in RAN 132. For instance, the modifications to the rules may discourage usage by the subscriber while he/she is located in the area of RAN 132 that is congested. Rules controller 124 may downgrade Quality of Service (QoS) predefined in the service plan for one or more services, may increase tariffs predefined in the service plan for one or more services, or may otherwise modify the (policy and/or charging) rules from the service plan to discourage usage by the subscriber. The modifications to the rules may encourage usage by the subscriber while he/she is located in this area of RAN 132. Rules controller 124 may increase QoS predefined in the service plan for one or more services, may decrease tariffs predefined in the service plan for one or more services, etc.

In step 210, rules controller 124 sends the modified rules to PCRF 102. PCRF 102 may then use the modified rules when making a PCC decision for a service requested by the subscriber. In this embodiment, the subscriber may not yet have requested the service when rules controller 124 provides the modified rules to PCRF 102. In another embodiment, a session may be established for the subscriber to receive the service, and rules controller 124 may provide the modified rules mid-session for a new PCC decision. In any case, PCRF 102 is able to make a PCC decision based on the modified rules provided by charging system 120 instead of the rules defined in the service plan of the subscriber. Steps 204-210 of method 200 then repeat for other subscribers located in this area of RAN 132.

Charging system 120 provides the modified rules for the subscribers to temporarily change how services are provided by the packet core network. Charging system 120 does not actually change the rules predefined in the service plan of a subscriber, but changes the rules that are sent to PCRF 102 for a PCC decision. In other words, charging system 120 sends the modified rules to PCRF 102 in the place of the predefined rules from a service plan so that the modified rules will be used for a PCC decision. After the congestion condition ends in RAN 132, the predefined rules from the service plan may again be used for a PCC decision.

Rules controller 124 may specify limitations on how the modified rules are used. For example, the modified rules may be valid for a duration of time, such as 2 hours. The modified rules may be valid while the subscriber is at a particular location. The modified rules may be valid for particular service/media types. Rules controller 124 may indicate the limitations on the modified rules to PCRF 102.

When charging system 120 generates modified rules for a subscriber, it may be advantageous to notify the subscriber of the modified rules. Therefore, rules controller 124 may send a notification to mobile device 136 of the subscriber describing the modified rules. For example, if the modified rules include a downgraded QoS, then the notification may indicate that the QoS has been downgraded, the amount the QoS was downgraded, etc. If the modified rules include an increased tariff, then the notification may indicate how much the tariff is increased, and/or the newly increased tariff. The notification may be sent to mobile device 136 as a text message (e.g., SMS or MMS), an email, etc.

In order for charging system 120 to receive the traffic reports for RAN 132, the interface between PCRF 102 and charging system 120 may be enhanced in the following embodiments. In the illustrated figures, the interface between PCRF 102 and charging system 120 is a Diameter Sy interface. In order to provide a traffic report to charging system 120, new Attribute Value Pairs (AVP) are defined for the Diameter Sy interface. One of the new AVPs is defined for data that indicates a location where a congestion condition exists in RAN 132. For example, a cell identifier (ID) may be used to indicate a location where a congestion condition exists. Therefore, the new AVP may be defined for a cell ID, and may be named "Congestion-Cell-ID" or something similar.

Another one of the new AVPs is defined for data that indicates a level of congestion in RAN 132. A congestion level may be an integer value in the range of 0-10, 0-100, etc. The new AVP may be named "Congestion-Level" or something similar.

Another one of the new AVPs is defined for data that indicates a time when the congestion condition exists in RAN 132. This AVP may include a start timestamp when the congestion condition was initially identified, and may also indicate how long the congestion condition is expected to last (e.g., duration or stop timestamp). The new AVP may be named "Congestion-Times" or something similar.

By modifying rules for subscribers due to a congestion condition detected in RAN 132, charging system 120 can discourage or encourage usage of mobile devices in certain locations within RAN 132. For example, assume that a cell is located near a rail station terminal, a bus terminal, or a similar location. Around 5:00 P.M. on weekdays, this cell can become severely congested due to the number of people who are heading home from work. To address this problem, charging system 120 may adjust the policy and/or charging rules while the end users are located in this cell. Charging system 120 may downgrade QoS, increase tariffs, or otherwise adjust the policy and/or charging rules of the end users that are in range of this base station. The modification to the rules will discourage the end users from accessing the mobile network through this base station, which will serve to relieve the congestion issue at the base station.

At the same time, if the end users travel to locations that are served by cells that are underutilized, then charging system 120 may reward these end users for using these cells instead of cells that are more prone to congestion. Charging system 120 may modify the rules to upgrade QoS, decrease tariffs, or otherwise adjust the policy and/or charging rules when end users are located in areas of RAN 132 that are not congested. This will encourage the end users to wait until they are in a non-congested area of RAN 132 before making calls, surfing the web, sending emails, etc. Charging system 120 can therefore shape traffic in RAN 132 by modifying policy and/or charging rules of the subscribers.

Example

Figure 3:
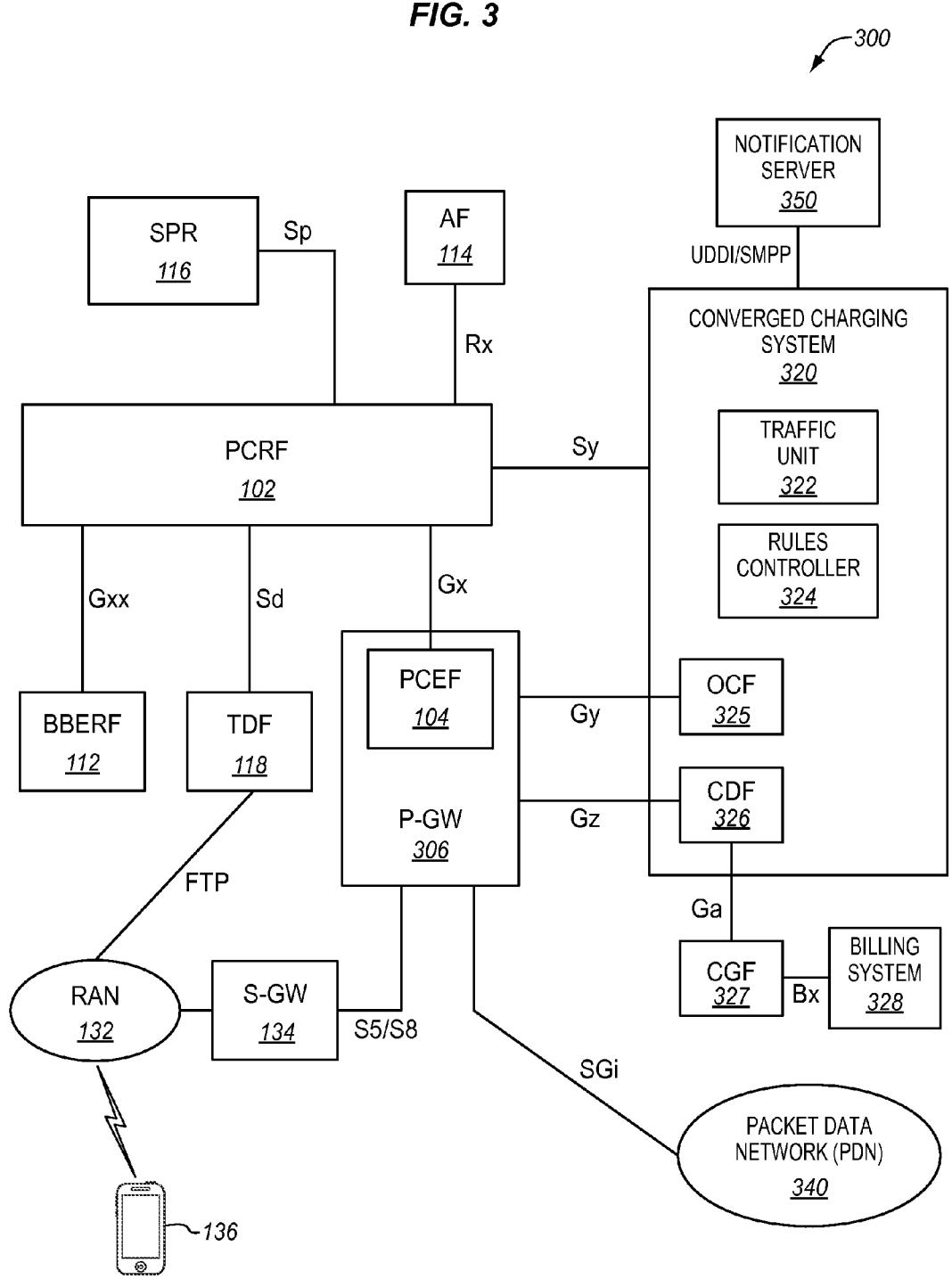
FIG. 3 illustrates a PCC architecture in another exemplary embodiment.
Figure 4:
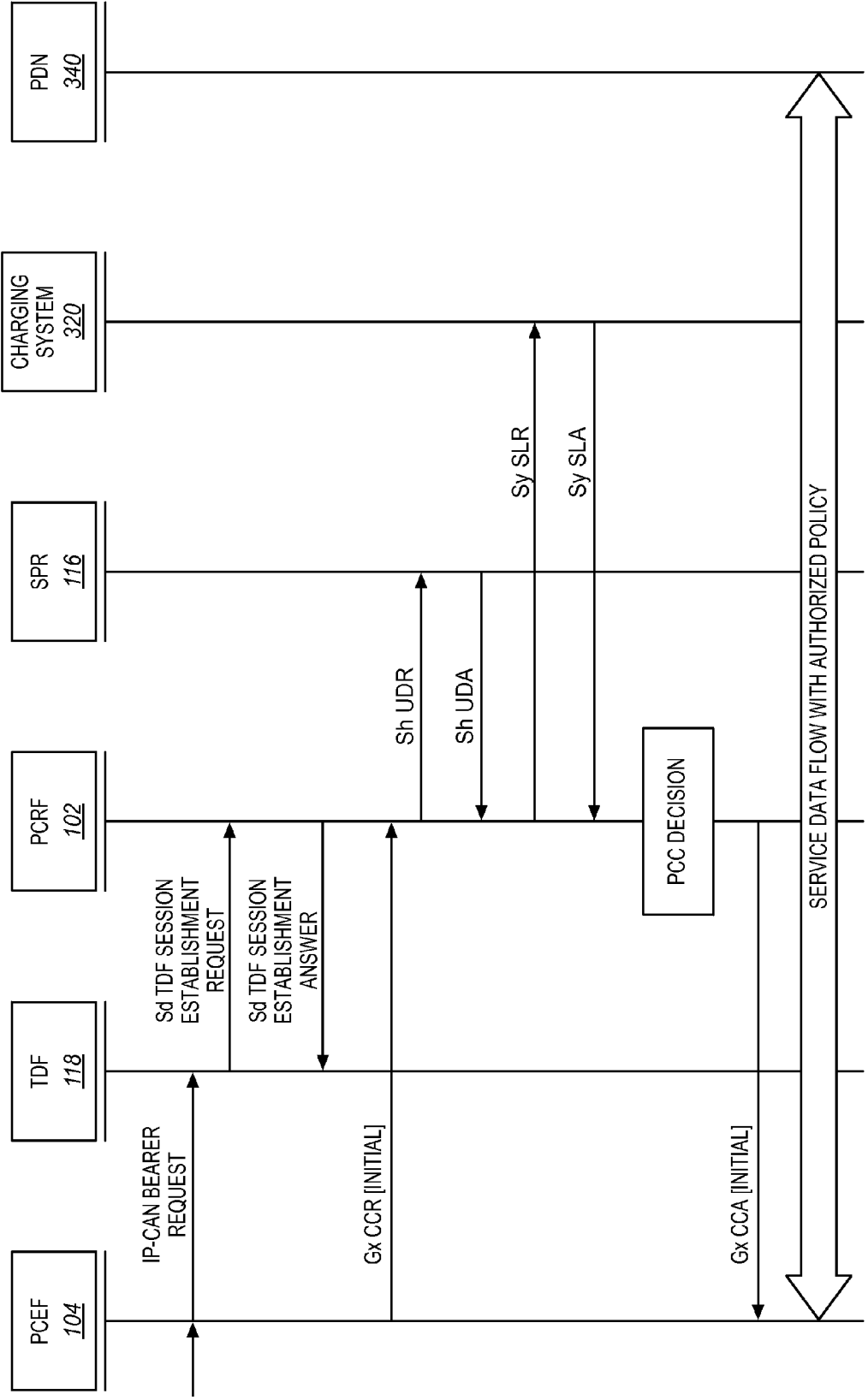
FIG. 4 is a message diagram that illustrates the establishment of a session in an exemplary embodiment.

FIGS. 3-5 illustrate an example of handling congestion in a RAN by modifying policy and/or charging rules within a charging system. FIG. 3 illustrates another PCC architecture 300 in an exemplary embodiment. PCC architecture 300 is similar to FIG. 1, except that the charging system 320 in architecture 300 represents a converged charging system. Charging system 320 is converged in that it includes both an Online Charging System (OCS) and Offline Charging System (OFCS). Charging system 320 maintains information on service plans of subscribers (e.g., tariff plan, usage based discount, bucket/bonus plan) that predefine charging and control rules.

Charging system 320 includes a traffic unit 322, a rules controller 324, an Online Charging Function (OCF) 325, and a Charging Data Function (CDF) 326. OCF 325 performs the online charging operations based on Diameter credit requests received from PCEF 104. CDF 326 performs the offline charging operations by generating Charging Data Records (CDRs) based on Diameter accounting requests received from PCEF 104. Charging system 320 may include other elements of an online charging system or an offline charging system, such as an Account Balance Management Function (ABMF) and a Rating Function (RF).

RAN 132 represents the access portion of a network. In this example, RAN 132 includes a probe (not shown) that is able to report traffic conditions to TDF 118. The traffic report from the probe includes a cell ID indicating the area of RAN 132 that is congested, a time stamp indicating the time of congestion, and possibly a level of congestion. When TDF 118 receives the traffic report from the RAN probe, TDF 118 will process the report and enter congestion conditions/levels and time/Cell IDs to PCRF 102 through the Sd reference point.

If a service data flow goes through TDF 118, then TDF 118 may optionally have a built-in Deep Packet Inspection (DPI) (such as Streaming, P2P, VoIP, messaging, browsing, download and multi-media) and Shallow Inspection (port, destination, protocol) capabilities to detect traffic. TDF 118 is then able to detect congestion conditions/levels, and report them to PCRF 102.

PCRF 102 may then provide the traffic reports to charging system 320 over the Diameter Sy interface. When charging system 320 receives the traffic report from PCRF 102, charging system 320 stores and maintains the traffic data in an internal traffic database. The database stores information on cell IDs that are congested, timestamps, subscribers located in areas that are congested, etc.

Assume for this example that an end user of mobile device 136 subscribes to a service plan with a service provider. As part of that service plan, policy rules and charging rules are predefined for the end user. The policy rules and charging rules are typically used by PCRF 102 when making a PCC decision for a session initiated for the end user. In the example provided below, charging system 320 will modify the policy and/or charging rules that are sent to PCRF 102 for a PCC decision when there is congestion in RAN 132.

FIG. 4 is a message diagram that illustrates the establishment of a session in an exemplary embodiment. To start in FIG. 4, mobile device 136 initiates a session request to P-GW 306 (which includes PCEF 104) through RAN 132 and S-GW 134 to establish an IP-CAN session. PCEF 104 then forwards the session request to TDF 118. In response to the session request, TDF 118 sends a Diameter Sd session request to PCRF 102. PCRF 102 responds to TDF 118 with a Diameter Sd session response, and TDF 118 sets up detection criteria for traffic monitoring and control in service data flows established for the session.

PCEF 104 then sends a Diameter Gx Credit-Control-Request (CCR) [initial] to PCRF 102 to initiate IP-CAN session establishment, and to request authorization of allowed service(s) and PCC rules information. When PCRF 102 receives the Gx CCR [initial] message, PCRF 102 sends a Diameter Sh User-Data-Request (UDR) to SPR 116 requesting a subscriber profile for the end user of mobile device 136. SPR 116 locates the subscriber profile for the end user, and responds to PCRF 102 with a Diameter Sh User-Data-Answer (UDA) that includes the subscriber profile.

PCRF 102 then queries charging system 320 for information by sending a Diameter Sy Spending-Limit-Request (SLR) to charging system 320. The SLR requests subscriber accounting data and charging policy data which was predefined by the end user or the service provider in a service profile. Charging system 320 responds back to PCRF 102 with a Diameter Sy Spending-Limit-Answer (SLA) that indicates one or more of a rating for the session, control rules, gating control, and the like, etc. PCRF 102 then makes a PCC decision based on the policy and charging rules for the end user. In other words, PCRF 102 generates PCC rules for the session based on the information provided by charging system 320. PCRF 102 then provides the PCC rules to PCEF 104 for enforcement by sending a Diameter Gx Credit-Control-Answer (CCA) [initial] to PCEF 102 with the PCC rules and with authorization for the IP-CAN session. PCEF 104 enforces the PCC rules from PCRF 102. Service data flows may then be established toward packet data network 340 for the IP-CAN session. Although not shown in FIG. 4, PCEF 104 sends Diameter Gy or Gz charging requests toward charging system 320 to charge for the service data flows. Charging system 320 begins charging for the session, and responds accordingly to PCEF 104.

FIG. 5 is a message diagram that illustrates charging system 320 modifying policy and/or charging rules to address congestion in RAN 132 in an exemplary embodiment. This message diagram illustrates the scenario where TDF 118 detects congestion within RAN 132 during a session. Charging system 320 is able to dynamically alter the charging policy for the subscriber in response to the congestion condition in RAN 132. To start, the RAN probe detects one or more congested cells within RAN 132. The RAN probe then generates a traffic report that indicates the cell ID(s) for the congested cell(s), and sends the traffic report to TDF 118. TDF 118 has traffic gating control set up during the initiation of the service data flow. Thus, TDF 118 detects the application changes or network traffic changes, and that these changes hit thresholds defined in the policy rules. TDF 118 therefore sends a Diameter Sd CCR [update] to PCRF 102 reporting the changes. PCRF 102 responds back to TDF 118 with a Diameter Sd CCA [update].

PCRF 102 caches the RAN traffic data (e.g., location, time, congestion level). PCRF 102 may also interface with SPR 116 to verify the subscribers in the affected areas of RAN 132, and store subscriber IDs in a local database (these steps are not shown in FIG. 5). In this example, a service data flow for mobile device 136 is affected by the congestion detected in this area of RAN 132 on account of being located in the cell that is congested.

PCRF 102 sends a Diameter Sy SLR [update] to charging system 320 with the traffic report for RAN 132. The traffic report includes a description of the congestion conditions, such as a location, time, congestion level, and possibly identifiers for mobile devices being serviced by the congested cell. One example of the Sy SLR [update] may be as follows:

```
<SL-Request> ::= < Diameter Header: xxx, REQ, PXY >
                 < Session-Id >
                 { Auth-Application-Id }
                 { Origin-Host }
                 { Origin-Realm }
                 { Destination-Realm }
                 { Destination-Host }
                 { Re-Auth-Request-Type }
                 [ User-Name ]
                 [ Supported-Features ]
                 [ Subscription-Id ]
                 [ Origin-State-Id ]
                 [ Event-Report-Indication ]
                 [ Network-Request-Support ]
                 [ Packet-Filter-Information ]
                 [ Packet-Filter-Operation ]
                 [ Bearer-Identifier ]
                 [ Bearer-Operation ]
                 [ Framed-IP-Address ]
                 [ Framed-IPv6-Prefix ]
                 [ IP-CAN-Type ]
```

```
[ RAT-Type ]
[ Termination-Cause ]
[ User-Equipment-Info ]
[ 3GPP-SGSN-MCC-MNC ]
[ 3GPP-SGSN-Address ]
[ 3GPP-SGSN-IPv6-Address ]
[ RAI ]
[ 3GPP-User-Location-Info]
[ 3GPP-MS-TimeZone ]
[ Called-Station-ID ]
[ Bearer-Usage ]
[ Event-Trigger ]
[ Congestion-Cell-IDs ]
[ Congestion-Level ]
[ Congestion-Times ]
[ Event-Timestamp ]
[ Service-Information ]
[ Proxy-Info ]
[ Route-Record ]
[ AVP]
```

To provide the traffic report to charging system 320 over the Diameter Sy interface, new AVPs are defined in the Sy interface (indicated in bold above). The first new AVP is defined for data that indicates a location of the congestion condition in RAN 132. The first new AVP is named "Congestion-Cell-ID" and has a data-type to indicate one of more cell IDs of cells that are congested. The second new AVP is defined for data that indicates a level of congestion in RAN 132. The second new AVP is named "Congestion-Level", and has a data-type to indicate a level of congestion, such as a range of integers. The third new AVP is defined for data that indicates a time when the congestion condition exists in RAN 132. The third new AVP is named "Congestion-times" and has a data type to indicate a start time for a congestion condition, an end time for a congestion condition, a duration of a congestion condition, etc.

In response to the Diameter Sy SLR, charging system 320 updates the traffic data for RAN 132 that is stored in the traffic unit 322. Rules controller 324 then runs a rule engine to see if there are charging rules and charging rate changes desired based on the traffic report on RAN 132. If changes are desired based on the traffic report, then rules controller 324 identifies the end users that are affected by the congestion condition in RAN 132. Rules controller 324 also identifies service plans for the end users affected by the congestion condition. Rules controller 324 then generates modified rules that deviate from the predefined rules in the service plans of the end users in response to the congestion condition found in RAN 132. Rules controller 124 then provides the modified rules to PCRF 102 by sending a Diameter Sy SLA to PCRF 102. The following illustrates an example of a Diameter Sy SLA indicating the modified rules:

```
<SL-Answer> ::= < Diameter Header: xxx, REQ, PXY >
                < Session-Id >
                { Auth-Application-Id }
                { Origin-Host }
                { Origin-Realm }
                { Destination-Realm }
                { Destination-Host }
                { Re-Auth-Request-Type }
                [ Supported-Features ]
                [ Session-Release-Cause ]
                [ Origin-State-Id ]
                [ Event-Trigger ]
                [ Event-Report-Indication ]
                [ QoS-Rule-Remove ]
                [ QoS-Rule-Install ]
                [ Charging-Rule-Remove ]
                [ Charging-Rule-Install ]
                [ Default-EPS-Bearer-QoS ]
                [ QoS-Information ]
                [ Revalidation-Time ]
                [ Proxy-Info ]
                [ Route-Record ]
                [ AVP]
```

In response to the Diameter Sy SLA, PCRF 102 makes a new PCC decision based on the modified rules provided by charging system 320 instead of the rules defined in the service plan of the subscriber. PCRF 102 then sends a Diameter Re-Authorization Request (RAR) to PCEF 102. PCEF 104 responds back to PCRF 102 with a Re-Authorization Answer (RAA). PCEF 104 then sends a Diameter Gx CCR [update] to PCRF 102 to request the new PCC rules for the session. PCRF 102 responds back to PCEF 104 with a Diameter CCA [update] that includes the updated PCC rules. PCEF 104 then enforces the updated PCC rules, and sends Diameter Gy or Gz update requests to charging system 320 based on updated PCC rules. Charging system 320 may use the new charging information to determine the rate for the updated IP-CAN session. The service data connection to PDN 340 is updated with the new policy and other parameters.

Because charging system 320 is able to modify the rules of the end user, charging system 320 can discourage the end user from continuing the present session or starting a new session while being served by a cell that is congested. Similar modifications occur for other end users that are in the area of the congested cell. Thus, charging system 320 can essentially shape traffic away from these congested cells and help to spread the traffic towards other cells that are being underutilized. For example, instead of an end user placing a call when he/she is located at a busy train terminal, the end user may wait until he/she travels into a less populated area where the surrounding cells are underutilized and free from congestion.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

We claim:

1. A system comprising:
a charging system configured to charge for sessions established over a packet core network, the charging system comprising:
a traffic unit configured to periodically receive traffic reports for a Radio Access Network (RAN) that provides connectivity of mobile devices to the packet core network, and to analyze the traffic reports to detect a congested cell of the RAN that is experiencing excessive traffic; and
a rules controller configured to store service plans for subscribers;
the rules controller is configured to identify a plurality of subscribers located in the congested cell;
for each subscriber located in the congested cell, the rules controller is configured to identify a service plan that includes predefined rules for the subscriber, to generate modified rules that deviate from the predefined rules in the service plan of the subscriber to discourage the subscriber from accessing services while located in the congested cell, to provide the modified rules to a network entity that performs policy and charging control for services requested by the subscriber to temporarily change the rules that are applied for the services while the subscriber is located in the congested cell, and to revert back to the predefined rules when the subscriber leaves the congested cell.

2. The system of claim 1 wherein:
the rules controller is configured to generate the modified rules to downgrade a Quality of Service (QoS) predefined in the service plan while the subscriber is located in the congested cell.

3. The system of claim 1 wherein:
the rules controller is configured to generate the modified rules to increase a tariff predefined in the service plan while the subscriber is located in the congested cell.

4. The system of claim 1 wherein:
the rules controller is configured to send a notification to a mobile device of the subscriber describing the modified rules.

5. The system of claim 1 wherein:
the traffic unit is configured to analyze the traffic reports to detect an underutilized cell of the RAN; and
the rules controller is configured to identify a plurality of subscribers located in the underutilized cell;
for each subscriber located in the underutilized cell, the rules controller is configured to identify a service plan that includes predefined rules for the subscriber, to generate modified rules that deviate from the predefined rules in the service plan of the subscriber to encourage the subscriber to access services while located in the underutilized cell, and to provide the modified rules to the network entity to temporarily change the rules that are applied for services while the subscriber is located in the underutilized cell.

6. The system of claim 1 wherein:
the network entity comprises a Policy and Charging Rules Function (PCRF); and
the charging system is configured to connect to the PCRF over a Diameter Sy interface.

7. The system of claim 6 wherein:
the charging system is configured to receive a message from the PCRF that includes an Attribute Value Pair (AVP) that defines a cell identifier for the congested cell.

8. The system of claim 6 wherein:
the charging system is configured to receive a message from the PCRF that includes an Attribute Value Pair (AVP) that defines a congestion level for the congested cell.

9. The system of claim 6 wherein:
the charging system is configured to receive a message from the PCRF that includes an Attribute Value Pair (AVP) that defines a time during which the congested cell experiences the excessive traffic.

10. A method operable in a charging system that charges for sessions established over a packet core network, the method comprising:
periodically receiving, in the charging system, traffic reports for a Radio Access Network (RAN) that provides connectivity of mobile devices to the packet core network;
analyzing, by the charging system, the traffic reports to detect a congested cell of the RAN that is experiencing excessive traffic;
identifying, by the charging system, a plurality of subscribers located in the congested cell;
for each subscriber located in the congested cell,
identifying a service plan that includes predefined rules for the subscriber;
generating, by the charging system, modified rules that deviate from the predefined rules in the service plan of the subscriber to discourage the subscriber from accessing services while located in the congested cell;
providing the modified rules to a network entity that performs policy and charging control for services requested by the subscriber to temporarily change the rules that are applied for the services while the subscriber is located in the congested cell; and
reverting back to the predefined rules when the subscriber leaves the congested cell.

11. The method of claim 10 wherein generating the modified rules comprises:
downgrading a Quality of Service (QoS) predefined in the service plan while the subscriber is located in the congested cell.

12. The method of claim 10 wherein generating the modified rules comprises:
increasing a tariff predefined in the service plan while the subscriber is located in the congested cell.

13. The method of claim 10 further comprising:
sending a notification to a mobile device of the subscriber describing the modified rules.

14. The method of claim 10 further comprising:
analyzing the traffic reports to detect an underutilized cell of the RAN;
identifying a plurality of subscribers located in the underutilized cell;
for each subscriber located in the underutilized cell,
identifying a service plan that includes predefined rules for the subscriber;
generating modified rules that deviate from the predefined rules in the service plan of the subscriber to encourage the subscriber to access services while located in the underutilized cell; and providing the modified rules to the network entity to temporarily change the rules that are applied for services while the subscriber is located in the underutilized cell.

15. The method of claim 10 wherein:
the network entity comprises a Policy and Charging Rules Function (PCRF);
providing the modified rules from the charging system comprises connecting to the PCRF over a Diameter Sy interface; and
receiving the traffic reports for the RAN comprises receiving the traffic reports for the RAN from the PCRF.

16. The method of claim 15 wherein receiving the traffic reports for the RAN comprises:
receiving a message from the PCRF that includes an Attribute Value Pair (AVP) that defines a cell identifier for the congested cell.

17. The method of claim 15 wherein receiving the traffic reports for the RAN comprises:
receiving a message from the PCRF that includes an Attribute Value Pair (AVP) that defines a congestion level in the congested cell.

18. The method of claim 15 wherein receiving the traffic reports for the RAN comprises:
receiving a message from the PCRF that includes an Attribute Value Pair (AVP) that defines a time during which the congested cell experiences the excessive traffic.

19. A system comprising:
a charging system coupled to a Policy and Charging Rules Function (PCRF) over a Diameter Sy interface;
the charging system is configured to receive a message from the PCRF over the Diameter Sy interface that includes a traffic report indicating a congested cell of a Radio Access Network (RAN);
the charging system is configured to run a rules engine to determine if rule changes are desired based on the traffic report;
when changes are desired, the charging system is configured to identify subscribers in the congested cell, to identify service plans for the subscribers, to modify rules from the service plans of the subscribers to discourage the subscribers from accessing services while located in the congested cell, and to provide the modified rules to the PCRF over the Diameter Sy interface to temporarily change the rules that are applied for the services while the subscribers are located in the congested cell;
the PCRF is configured to make Policy and Charging Control (PCC) decisions for the subscribers based on the modified rules provided by the charging system;
the PCRF is configured to make PCC decisions for the subscribers based on the predefined rules when the subscribers leave the congested cell.

20. The system of claim 19 further comprising:
a Traffic Data Function (TDF) configured to receive traffic data for the RAN, to detect the congested cell, and to send a report to the PCRF indicating the congested cell.

* * * * *